United States Patent [19]

Fedor

[11] Patent Number: 4,507,025
[45] Date of Patent: Mar. 26, 1985

[54] COMBINED TORQUE AND THRUST OVERLOAD RESPONSIVE TOOL HOLDER

[75] Inventor: John W. Fedor, Pepper Pike, Ohio

[73] Assignee: Masco Machine Incorporated, Highland Hts., Ohio

[21] Appl. No.: 501,874

[22] Filed: Jun. 7, 1983

[51] Int. Cl.$^3$ .............................................. B23B 49/00
[52] U.S. Cl. ............................................ 408/6; 408/9; 408/11; 408/139
[58] Field of Search .................. 408/6, 9–11, 408/16, 238, 710, 711, 139; 73/862.06

[56] References Cited

U.S. PATENT DOCUMENTS

| | | | |
|---|---|---|---|
| 3,283,618 | 11/1966 | Schatzman | 408/11 |
| 3,299,697 | 1/1967 | Sparling | 408/16 |
| 3,381,550 | 5/1968 | Smith | 408/16 |
| 3,566,719 | 3/1971 | Smith | 408/16 |
| 3,627,437 | 12/1971 | Smith | 408/16 |
| 3,652,099 | 3/1972 | Bilz | 408/16 X |
| 3,723,017 | 3/1973 | Bilz et al. | 408/16 |
| 3,816,015 | 6/1974 | Bilz et al. | 408/6 |
| 4,090,802 | 5/1978 | Bilz | 408/6 |
| 4,115,025 | 9/1978 | Petroff | 408/6 |
| 4,193,720 | 3/1980 | Machida | 408/11 |
| 4,260,305 | 4/1981 | Clopton | 408/6 X |

FOREIGN PATENT DOCUMENTS

| | | | |
|---|---|---|---|
| 0320350 | 3/1972 | U.S.S.R. | 408/6 |
| 0422988 | 9/1974 | U.S.S.R. | 73/862.06 |
| 0545882 | 2/1977 | U.S.S.R. | 73/862.06 |
| 0622638 | 9/1978 | U.S.S.R. | 408/10 |

Primary Examiner—William R. Briggs
Assistant Examiner—Glenn L. Webb
Attorney, Agent, or Firm—Peare, Gordon, Sessions, McCoy, Granger & Tilberry

[57] ABSTRACT

A tool holder assembly which includes a support and a chuck for a tool is disclosed in which the tool holder may be responsive to either torque or thrust overload, or a combination of both. The tool holder includes a movable signal member in the form of a longitudinally movable sleeve which may be actuated rearwardly to actuate a proximity switch to stop rotation of the tool holder assembly, for example. Spring means acts between the chuck and the support, with this spring means being preloaded. A hemispherical projection and a conical recess act between the chuck and the support so that if a longitudinal thrust is provided on the tool and chuck, it is transmitted directly through this projection and conical recess to additionally prestress the spring means and to rearwardly move the signal member sleeve. If an overload of torque is provided on the tool and chuck, then the hemispherical projection acts on the conical recess as a cam follower with a limited rotational movement between the chuck and the support to move the signal member sleeve rearwardly to actuate the proximity switch. The foregoing abstract is merely a resume of one general application, is not a complete discussion of all principles of operation or applications, and is not to be construed as a limitation on the scope of the claimed subject matter.

20 Claims, 7 Drawing Figures

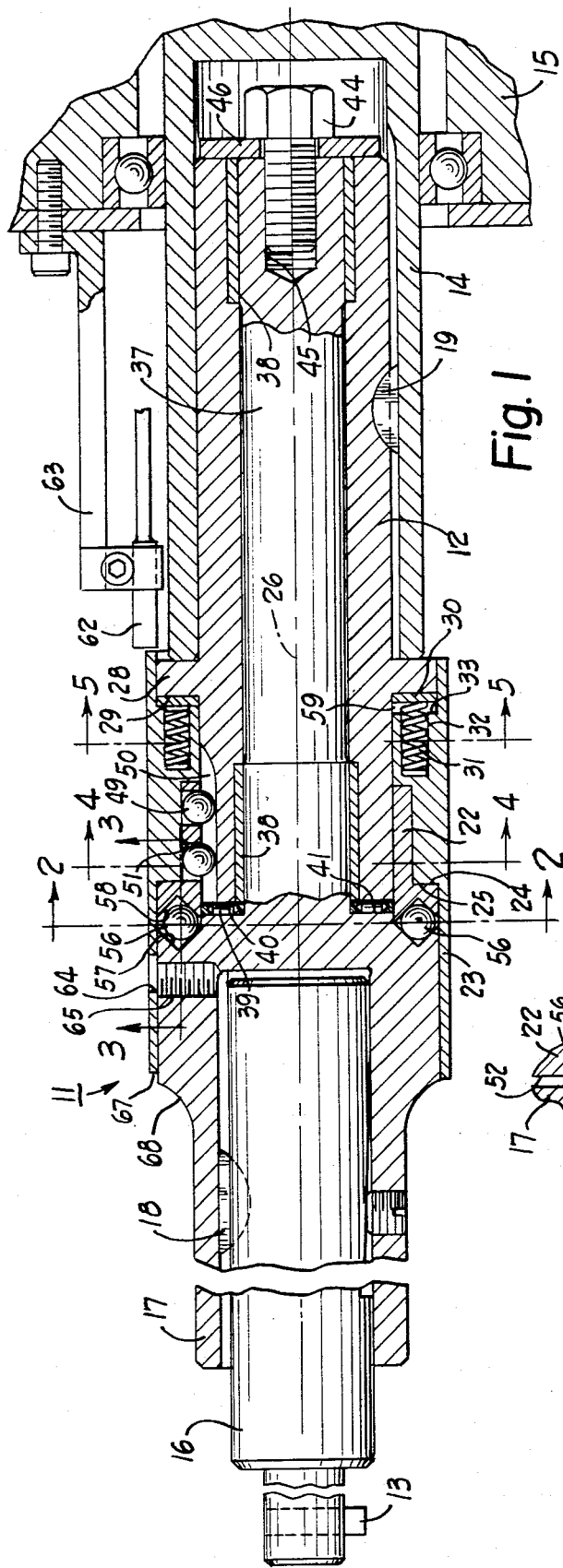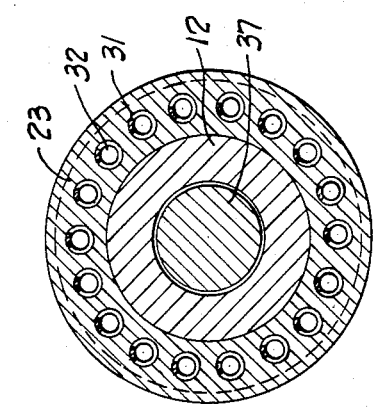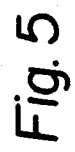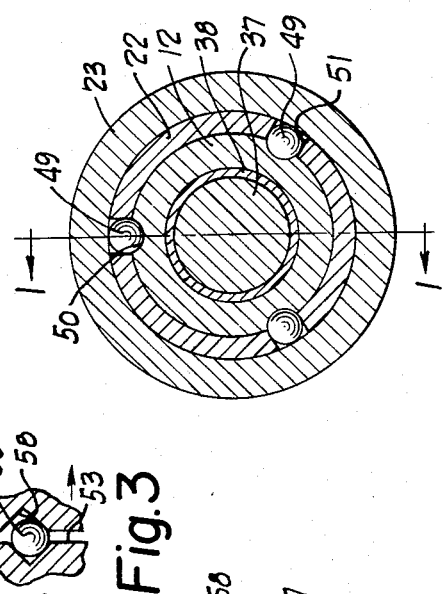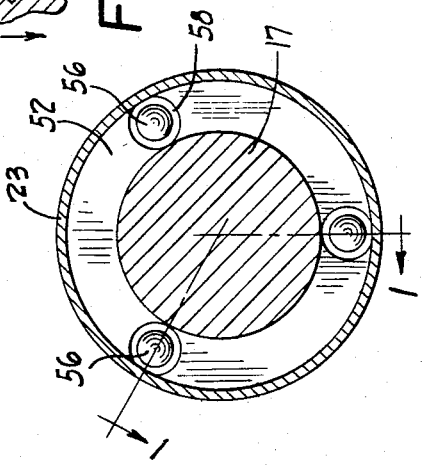

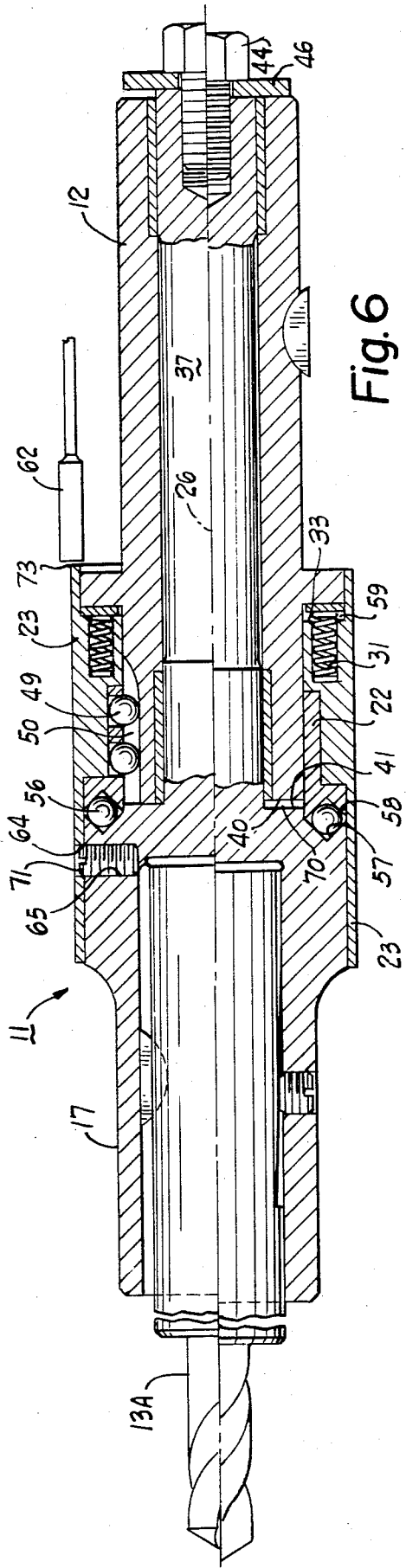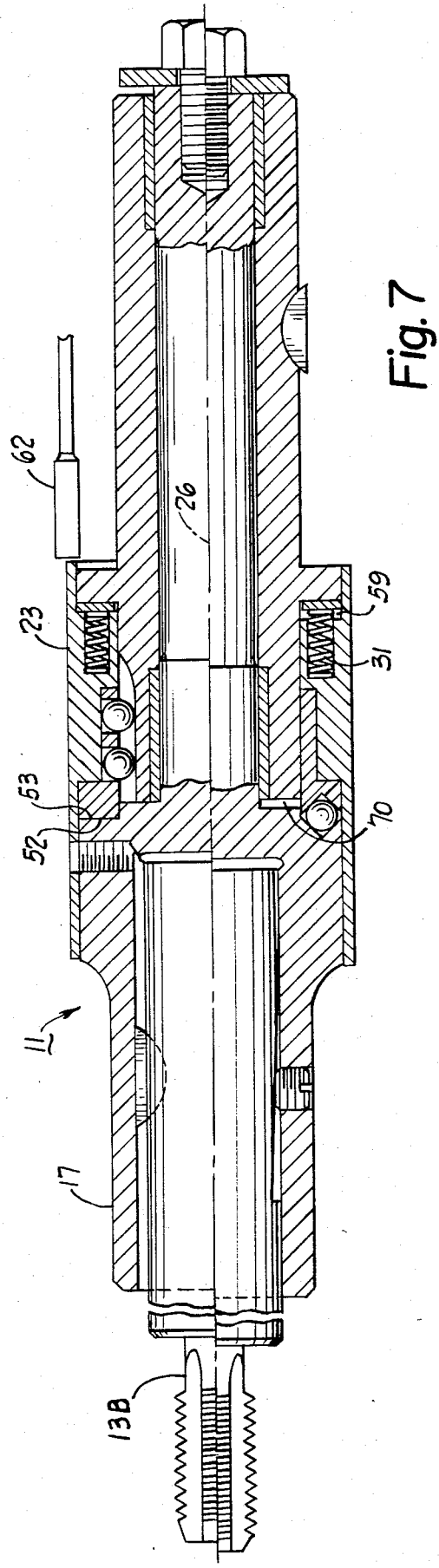

COMBINED TORQUE AND THRUST OVERLOAD RESPONSIVE TOOL HOLDER

BACKGROUND OF THE INVENTION

Overload sensing tool holders have been proposed and have been of either of two types, either torque or thrust overload. U.S. Pat. Nos. 3,299,697 and 4,193,720 disclose structures responsive to a torque overload. The former patent shows a friction clutch which transmits enough torque to have a gear commence rotating upon torque overload and this gear rotation is sensed by an electromagnetic pickup. The latter patent has interengaging cam surfaces held together by a torsion spring, and upon torque overload, the cam surfaces relatively rotate to axially move a central rod actuating a miniswitch.

The thrust overload devices have been numerous, including those devices shown in U.S. Pat. Nos. 3,381,550; 3,566,719; 3,627,437; 3,652,099; 3,723,017; 3,816,015; 4,090,802; 4,115,025; and 4,260,305. In these devices, an axial thrust overload moves a part on the tool holder axially rearwardly to uncover a radioactive ring sensed by a Geiger counter, to actuate a radiotransmitter, or to actuate a proximity switch or other switch.

Some of these patented devices have been placed on the market, but many are too insensitive, cannot be adjusted readily, are too complicated, or are not versatile enough to be able to be used with all types of tools. For example, with a tool holder carrying a tap which advances toward a workpiece only to find that no hole has been previously drilled for the tap, the thrust overload units would be satisfactory, but a torque overload unit would not be. If, on the other hand, a counterboring tool is performing an undercutting operation in a hole, and the tool is dull, then the torque overload unit could possibly sense this worn tool, but a thrust overload device would be useless.

Accordingly, the problem to be solved is how to construct an overload sensing tool holder which is economical, easy to adjust, and versatile for either torque or thrust overload, or both.

SUMMARY OF THE INVENTION

This problem is solved by a combined torque and thrust overload responsive tool holder assembly comprising, in combination a support, a chuck adapted to hold a tool to cut a workpiece and having an axis, a movable signal member, spring means acting between said chuck and said support, means to preload said spring means, thrust means acting between said chuck and said support and permitting limited longitudinal movement therebetween and having an output connected to move said signal member upon said thrust means being overloaded to cause said preloaded spring means to be additionally stressed, and torque means acting between said chuck and said support and permitting rotational movement therebetween about said axis and having an output connected to move said signal member upon said torque means being overloaded to cause said preloaded spring means to be additionally stressed.

Accordingly, an object of the invention is to provide a tool holder assembly which is responsive to either torque or thrust overload.

Another object of the invention is to provide an overload responsive tool holder wherein the same internal linkage is utilized for either torque or thrust overload conditions.

Other objects and a fuller understanding of the invention may be had by referring to the following description and claims, taken in conjunction with the accompanying drawing.

BRIEF DESCRIPTION OF THE DRAWING

FIG. 1 is a longitudinal, sectional view on line 1—1 of FIGS. 2 and 4;

FIG. 2 is a cross-sectional view on line 2—2 of FIG. 1;

FIG. 3 is a sectional view on line 3—3 of FIG. 1;

FIG. 4 is a cross-sectional view on line 4—4 of FIG. 1;

FIG. 5 is a cross-sectional view on line 5—5 of FIG. 1;

FIG. 6 is a longitudinal sectional view similar to FIG. 1, and with the tool holder assembly configured for a thrust-only response; and FIG. 7 is a longitudinal sectional view of the tool holder assembly configured for either thrust or torque actuation.

DESCRIPTION OF THE PREFERRED EMBODIMENT

FIGS. 1 to 5 show a tool holder assembly 11 wherein a support 12 supports a tool 13, which is adapted to cut a workpiece (not shown). The tool holder assembly 11 is adapted to hold the tool 13 so that relative rotation between the tool and the workpiece will cut the workpiece. To this end, the support 12 may be a support block to hold the tool in the turret of a turret lathe, for example, wherein the tool is nonrotational and the workpiece rotates. However, in FIG. 1, the assembly 11 has been shown with the support 12 as a generally cylindrical support shank to be received inside a rotatable spindle 14 on some kind of machine 15, such as a machining center. As is often customary today, the tool 13 is shown held in a tool adapter 16 for easy change in a holder for the tool, hereinafter termed a "chuck" 17. This chuck may have a key 18 for positive rotation of the tool 13, shown in FIG. 1 as a counterboring tool. Similarly, the support shank 12 is keyed at 19 to the rotatable spindle 14 for positive drive of the tool 13. The chuck 17 may be anything suitable, such as a collet, a quick-change tool holder, or the like.

Sleeve means are provided in the tool holder assembly, and these include an inner sleeve 22 and an outer sleeve 23. These sleeves interengage at longitudinally facing shoulders 24 and 25, respectively, so that they act as a single sleeve. These sleeves are concentric with the axis 26 of the tool holder assembly 11 and are disposed at the junction between the chuck 17 and support 12.

The support shank 12 has an annular collar 28 with a longitudinally forward facing shoulder 29 against which a washer 30 is placed to protect this shoulder 29 from the wearing effect of spring means 31. This spring means is shown as a plurality of coil compression springs disposed in axially parallel pockets 32 in a longitudinally rearwardly facing shoulder 33 on the outer sleeve 23. FIG. 5 shows that there are 18 such spring pockets 32, as an example, into which a selected number from 1 to 18 of the springs 31 may be placed to vary the spring force.

The chuck 17 has a rearward central shaft extension 37 which is journaled in low friction radial bearings 38 within the support shank 12. In the embodiment shown in FIG. 1, a thrust bearing 39, shown as a needle bearing, is disposed between a forward facing shoulder 40 on the support shank 12 and a rearwardly facing shoulder 41 on the chuck 17. The tool holder assembly 11 has means to preload or prestress the springs 31, and this includes a machine screw 44 engaging a central tapped hole 45 in the rear of the shaft extension 37. This machine screw has a head bearing against a washer 46 which bears against the rear ends of the shaft extension 37 and the rear end of the support shank 12. When such machine screw 44 is tightened, it traps the thrust bearing 39 between the shoulders 40 and 41 and the collar 28 compresses the plurality of springs 31 to prestress them.

The inner sleeve 22 is nonrotatably but slidably connected to the support shank 12. To this end, a low friction bearing or linear bearing is provided. This linear bearing consists of three pairs of balls 49, about half of each lying in a longitudinally parallel groove 50 in the forward end of the support shank 12, and the other half of these balls being carried in a socket or radial through hole 51 in the inner sleeve 22.

In the preloading of the springs 31, a forward facing shoulder 52 on the inner sleeve 22 engages a rearwardly facing shoulder 53 on the chuck 17. These shoulders 52 and 53 are better shown in FIG. 7 than in FIG. 1, because of the cross section on which FIG. 1 is taken.

Thrust means and torque means are provided in the tool holder assembly 11 and act between the chuck 17 and the support 12. This thrust means and torque means include a hemispherical projection and a coacting recess, with the projection acting on either the chuck 17 or the support shank 12, and the recess acting on the other of these two parts.

In the preferred embodiment shown in FIG. 1, the hemispherical projection is provided by one-half of each of three balls 56. Such balls may be merely a hemispherical projection secured to either the chuck 17 or the inner sleeve 22, or the ball may be disposed in a hemispherical socket, either loosely placed therein or secured therein as by silver solder. In the preferred embodiment of FIG. 1, the socket into which the balls 56 are placed is a conical socket 57 in the rearwardly facing shoulder 53 of chuck 17. The coacting recess with which the balls coact is a conical recess 58, one for each ball, in the forwardly facing shoulder 52 of the inner sleeve 22. The socket 57 and conical recess 58 are just deep enough so that the balls 56 are closely trapped therebetween when the shoulders 52 and 53 are in engagement by the prestress on the springs 31. Such prestress establishes a small annular space 59 between the washer 30 and the rearwardly facing shoulder 33 on the outer sleeve 23.

The outer sleeve 23 is a movable signal member which, in this embodiment, can move rearwardly, and when it so moves it actuates a proximity switch 62, which is held in any suitable mounting 63 on the machine 15. This proximity switch 62 may be conncted to a control means to effect a control, e.g., control of the machine 15.

A circular aperture 64 in the outer sleeve 23 is aligned with a tapped aperture 65 in the chuck 17 when the forward end 67 of the outer sleeve 23 is aligned with a shoulder 68 on the chuck 17. These are shown aligned in the lower half of FIG. 1, which is the unactuated condition, and they are shown misaligned in the top half of FIG. 1, which is the actuated condition of the signal member or outer sleeve 23.

In operation, the tool holder assembly 11 may be easily assembled in any one of three different configurations, shown respectively in FIGS. 1, 6, and 7. FIG. 1 shows it configured for torque only; FIG. 6 shows it configured for thrust only; and FIG. 7 shows it configured for either thrust or torque action. The differences among the three is that in FIG. 1 for torque-only action, the needle bearing 39 is placed in the annular space 70, which is shown in FIG. 6. The difference in FIG. 6 is that this needle bearing 39 is then removed and, instead, a lock screw 71 has been inserted through the aperture 64 into the tapped aperture 65, to lock together the outer sleeve 23 and the chuck 17. In FIG. 7, the difference is that both the needle bearing 39 and the lock screw 65 have been omitted.

When the tool holder assembly 11 is out of the spindle 14, such as is shown in FIGS. 6 and 7, the assembly 11 may be readily disassembled to be changed to a different configuration. The machine screw 44 is removed and this permits the support shank 12 to be removed rearwardly. The needle bearing 39 may be inserted or removed as desired and the tool holder 11 reassembled. Also, while the unit is apart, one or more springs 31 may be added or removed to change the spring force. The lock screw 71 may be inserted or removed from the exterior of the tool holder assembly 11 without necessity or disassembly thereof.

In the configuration of FIG. 1, this is for torque only. As stated above, the lower half of FIG. 1 shows the assembly in the unactuated condition, and the upper half of FIG. 1 shows it in the actuated condition, with the signal member or outer sleeve 23 moved rearwardly to actuate the proximity switch 62. In the unactuated condition, the rear end 73 of the outer sleeve 23 is flush with the rear of the collar 28, and in that condition the proximity switch is not actuated.

Upon a torque overload on the tool 13 relative to the support shank 12, the prestress on the springs 31 will be overcome, and the chuck 17 will have a limited rotation relative to the support 12, e.g., about one degree. In this condition, the balls 56 act as cam balls, riding up on the conical recess 58 as a cam follower to urge rearwardly both the inner and outer sleeve 22 and 23, respectively, against the urging of the springs 31. This is a limited rotational movement because, due to this cam action, the space 59 between the rear shoulder 33 and the washer 30 is eliminated, as shown in the transition from the lower half to the upper half of FIG. 1. Thus, the signal member outer sleeve 23 moves rearwardly, taking up this space and actuating the proximity switch 62.

This actuation of the proximity switch is a signal which can initiate any number of retaliatory responses. Those responses may include a complete shutdown of the machine 15, a retraction of the tool spindle 14 and a machine shutdown, a retraction and reinsertion of the tool 13, and reinstatement of the original machining cycle, etc. This rearward movement of the signal member sleeve 23 may be only a small amount, for example, 1/16 inch, in order to effect actuation of the proximity switch 62. This rearward movement of the inner sleeve 22 by the cam action of the balls 56 and conical recesses 58 is guided as a straight linear motion by the linear bearings 49 riding in the longitudinal grooves 50. Since the conical recesses 58 are shown as a 90-degree included angle, there is a 1:1 ratio between circumferential movement at the balls 56 and rearward linear movement of the signal outer sleeve 23.

In FIG. 6, the tool holder assembly 11 is configured for a thrust-only actuation, in which the needle bearing 39 is removed and the lock screw 71 is inserted to lock together the outer sleeve 23 and chuck 17. Again, in FIG. 6, the lower half thereof shows the unactuated condition, and the upper half shows the actuated condition wherein the signal outer sleeve has moved rearwardly to actuate the proximity switch 62. In this configuration, the machine screw 44 has again been initially tightened against the washer 46, which pulls the shaft extension 37 rearwardly against the urging of the springs 31 until the rear end of the shaft extension 37 is aligned with the rear end of the support shank 12. This establishes a prestress on the springs 31, and the space 59 adjacent the outer sleeve rear shoulder 33 will be approximately equal to the space 70 between the shoulders 40 and 41. The preload on the springs 31 causes the balls 56 to be trapped in engagement between the conical sockets 57 and the conical recesses 58.

When a thrust overload is encountered on the tool 13A which is greater than the force of the springs 31, then the chuck 17 is moved rearwardly, for example 0.050 or 0.060 inch to take up the space 59 and the space 70, against the bias of the springs 31. This rearward movement of the sleeve 23 is a direct action directly through the balls 56, sockets 57, and recesses 58. These members in this configuration do not act as a cam, but act merely as a direct force transmittal linkage. Again, the inner sleeve 22 moves only longitudinally because of the linear bearing 49,50. Due to the presence of the lock screw 71, the chuck 17 will not respond to a torque action inasmuch as the chuck 17 and outer sleeve 23 are locked together. For this reason, the outer sleeve 23 cannot move rearwardly relative to the chuck 17, such as is shown in the upper half of FIG. 1.

FIG. 7 shows the tool holder assembly 11 in the third configuration, omitting both the needle bearing 39 and the lock screw 71. In this configuration, the tool holder assembly is responsive both to thrust and to torque overloads. FIG. 7 is a true longitudinal section rather than being taken along the lines 1—1 of FIGS. 2 and 4, as was the sectional view of FIG. 1. Thus, in FIG. 7, the upper half thereof shows the shoulders 52 and 53 without the presence of the ball 56, because the balls 56 are displaced 60 degrees from the longitudinal section of FIG. 7.

The lower half of FIG. 7 is the unactuated condition, and the upper half of FIG. 7 is the actuated condition, actuated in response to a thrust overload. If the tool in the chuck 17 encounters an overload of thrust, it acts through the shoulders 52 and 53 directly onto the inner and outer sleeves 22 and 23 to move the outer sleeve 23 rearwardly to take up the spaces 59 and 70 and further compress the springs 31. The rearward movement of the outer sleeve 23 will thus actuate the proximity switch 62.

In the event that the configuration of FIG. 7 encounters a torque overload, then the action will be as shown in the top half of FIG. 1. The torque overload on the tool 13B will slow the rotation of the chuck 17 relative to the spindle 14; hence, the cam ball 56 will act on the cam conical recess 58 through a limited rotation of about 1 degree, for example, and as shown best in FIG. 3, this will spread apart the shoulders 52 and 53, moving the inner sleeve 22 rearwardly, which moves the outer sleeve 23 rearwardly so that the rear end 73 thereof actuates the proximity switch 62.

The tool holder assembly 11 can be used under many different conditions whenever any obstacle to relative rotational cutting is encountered, whether it be a dull cutting tool, hard spots in the material being cut, etc. Any condition that is detrimental to the cutting tool life or condition is to be avoided, and this tool holder assembly will accommodate such overloads, sensing whether it is torque or thrust, or a combination of both.

In FIG. 1 a counterboring tool 13 is shown and a tool holder assembly which is responsive only to thrust is useless in this condition, so the assembly 11 is configured to be responsive to torque only. In FIG. 6, a drill 13A is shown, and when drilling into a solid material, the thrust-only option best suits the condition. When reaming a previously drilled hole or when tapping a previously drilled hole, the combined torque and thrust configuration is perhaps best, as shown in FIG. 7. In this condition, the torque-responsive means will sense a dull tool in both rotational directions, and the thrust-responsive condition will sense a no-hole condition.

The inner sleeve 22 is a relatively simply manufactured part which may easily be substituted for one with shallower or steeper conical recesses 58 for a greater or lesser ratio, respectively, of torque-to-thrust overload conditions.

It will be seen from the many figures of the drawing that the spring means 31 acts between the chuck 17 and the support 12 by reacting against the collar 28 in one direction and reacting against the shoulder 53 in the other direction. It will also be noted that the spring means acts in series with the sleeves 22 and 23, the conical recesses 58, and the balls 56 in series between the support 12 and chuck 17. This series connection through the outer sleeve 23 means that this outer sleeve 23 may move rearwardly as a signal member to signal the switch 62 upon an overload condition. The spaces 59 and 70 are less than the depth of the hemispherical projection of the ball into the conical recess 58. The balls thus are trapped within the recesses and cannot rotationally slip out of such recesses, which would be a slipping clutch condition.

In the preferred embodiment, the hemispherical projections 56 are shown as balls which are freely movable within the conical sockets 57 and conical recesses 58. Since each of these conical surfaces is a 90-degree included angle, either one may act as the cam follower rather than only the conical recess 58 acting as a cam follower. Under the preloaded but unactuated condition, depending upon the tolerance in the dimensions of the parts, either the shoulders 52 and 53 may be in engagement, with the balls 56 slightly loose in the conical recesses, or the balls 56 may be tightly trapped between the conical surfaces and the shoulders 52 and 53 may be slightly spaced. In either event, the preloaded springs 31 will keep the sleeves 22 and 23 urged forwardly, or to the left as viewed in FIG. 1. This will establish the annulus space 59 for all configurations of FIGS. 1, 6, and 7 in the unactuated condition. This is the space which is eliminated upon a thrust or torque overload.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of contruction and the combination and arrangement of parts may be resorted to without departing from the spirit and scope of the invention as hereinafter claimed.

What is claimed is:

1. A combined torque and thrust overload responsive tool holder assembly comprising, in combination:
   a support;
   a chuck adapted to hold a tool to cut a workpiece and having an axis;
   a movable signal member including rotatable concentric sleeve means on the assembly;
   spring means acting between said chuck and said support;
   means to preload said spring means;
   thrust means acting between said chuck and said support and permitting limited longitudinal movement therebetween and having an output connected to move said signal member upon said thrust means being overloaded to cause said preloaded spring means to be additionally stressed; and
   torque means acting between said chuck and said support and permitting limited rotational movement therebetween about said axis and having an output connected to move said signal member upon said torque means being overloaded to cause said preloaded spring means to be additionally stressed.

2. A tool holder assembly as set forth in claim 1, including a switch mounted near said signal member to be actuable upon movement thereof.

3. A tool holder assembly as set forth in claim 2, wherein said switch is a proximity switch.

4. A tool holder assembly as set forth in claim 1, wherein said sleeve means on said tool holder assembly is rotatable with and at the same speed as said chuck.

5. A tool holder assembly as set forth in claim 4, wherein said sleeve means is actuable longitudinally rearwardly away from any said tool in the chuck upon overload of the assembly.

6. A tool holder assembly as set forth in claim 4, wherein each said thrust and torque means act through said spring means and sleeve means in series.

7. A tool holder assembly as set forth in claim 1, wherein
   at least part of said sleeve means is exposed on the exterior surface of the assembly.

8. A tool holder assembly as set forth in claim 7, including a lock screw between said sleeve means and said chuck to establish the assembly as responsive to an overload of thrust but not of torque.

9. A tool holder assembly as set forth in claim 7, wherein said sleeve means includes inner and outer sleeves.

10. A tool holder assembly as set forth in claim 9, including a linear low friction bearing between said inner sleeve and said support.

11. A tool holder assembly as set forth in claim 7, including a hemispherical projection and a coacting recess in both said thrust and torque means and acting between said chuck and support.

12. A tool holder assembly as set forth in claim 11, wherein said hemispherical projection and coacting recess act in series through said spring means and sleeve means between said chuck and said support.

13. A tool holder assembly as set forth in claim 12, wherein said recess is on said sleeve means.

14. A tool holder assembly as set forth in claim 12, wherein said projection is a ball mounted in a socket in said chuck.

15. A tool holder assembly as set forth in claim 12, wherein said spring means acts between said support and said sleeve means.

16. A tool holder assembly as set forth in claim 11, including a longitudinal space between said chuck and support and wherein said longitudinal space is less than the depth of said projection into said recess to preclude more than limited relative rotation between said chuck and support.

17. A tool holder assembly as set forth in claim 11, wherein said projection and coating recess act as a cam and follower during torque action and act for direct force transmittal during thrust action.

18. A tool holder assembly as set forth in claim 1, wherein said preload means includes a threaded member acting between said support and said chuck.

19. A tool holder assembly as set forth in claim 18, wherein said threaded member is tightenable to a condition establishing said preload and establishing a longitudinal space between said chuck and said support, which space may be eliminated upon a thrust overload to actuate said signal member.

20. A tool holder assembly as set forth in claim 18, including a thrust bearing and said threaded member is tightenable to a condition establishing said preload and establishing said thrust bearing tightened between said chuck and said support, which thrust bearing permits limited rotation between said chuck and said support upon a torque overload to actuate said signal member.

* * * * *